United States Patent [19]
Dobashi et al.

[11] Patent Number: 4,688,916
[45] Date of Patent: Aug. 25, 1987

[54] CAMERA WITH FOCAL PLANE SHUTTER

[75] Inventors: Toshio Dobashi, Yokohama; Masaharu Hara; Kazunobu Fukutani, both of Tokyo, all of Japan

[73] Assignee: Nippon Kogaku K. K., Tokyo, Japan

[21] Appl. No.: 830,755

[22] Filed: Feb. 19, 1986

[30] Foreign Application Priority Data

Feb. 22, 1985 [JP] Japan .................................. 60-32591

[51] Int. Cl.$^4$ ............................................. G03B 17/02
[52] U.S. Cl. .................................................. 354/288
[58] Field of Search ......... 354/202, 288, 226, 246-249

[56] References Cited

U.S. PATENT DOCUMENTS

| | | | |
|---|---|---|---|
| 3,950,768 | 4/1976 | Toyoda | 354/288 X |
| 4,092,656 | 5/1978 | Lang et al. | 354/202 |
| 4,163,612 | 8/1979 | Ueda et al. | 354/288 X |
| 4,303,328 | 12/1981 | Persson et al. | 354/288 |
| 4,381,889 | 5/1983 | Sahara et al. | 354/202 X |
| 4,457,607 | 7/1984 | Sekine et al. | 354/288 X |

FOREIGN PATENT DOCUMENTS

| | | | |
|---|---|---|---|
| 619811 | 10/1935 | Fed. Rep. of Germany | 354/288 |
| 2621228 | 12/1976 | Fed. Rep. of Germany | 354/246 |
| 36866 | 3/1980 | Japan | 354/288 |

Primary Examiner—Donald A. Griffin
Attorney, Agent, or Firm—Shapiro and Shapiro

[57] ABSTRACT

A camera comprises a housing provided therein with a film chamber and an aperture for exposure which opens in the film chamber, the housing being equipped with a cover member for opening or closing the film chamber, focal plane shutter means provided with a light-shielding blade member for closing the aperture for exposure, wherein the blade member can be retracted from the aperture for exposure to expose a photographic film loaded in the film chamber to light, means for detecting that the cover means has opened the film chamber, and control means for retracting the blade member from the aperture for exposure in response to an output from the detecting means.

2 Claims, 5 Drawing Figures

CAMERA WITH FOCAL PLANE SHUTTER

BACKGROUND OF THE INVENTION

1. Field of the Invention

The present invention relates to a camera equipped with a focal plane shutter, and in particular to the protection of shutter curtains or blades therein.

2. Related background art

In a camera equipped with a focal plane shutter, shutter blades closing an aperture for exposure are generally exposed and rendered accessible to the operator when a rear cover of the camera is opened, and careless contact with said shutter blades may cause deformation or breakage thereof.

In order to avoid such accident, there is already proposed to provide a protective plate which is extended behind the shutter blades to cover the same when the rear cover of the camera is opened. However, such system, involving the protective plate and a mechanism for moving said plate in relation to the movement of the rear cover, is inevitably complex in structure and bulky, and the protective plate cannot be strong enough as it has to be very thin because of the dimensional limitation of the camera.

SUMMARY OF THE INVENTION

An object of the present invention is to resolve such drawbacks and to provide a camera with a focal plane shutter, in which the shutter curtains are retracted from the aperture for exposure when the rear cover is opened.

DESCRIPTION OF THE PREFERRED EMBODIMENTS

Figure 1:
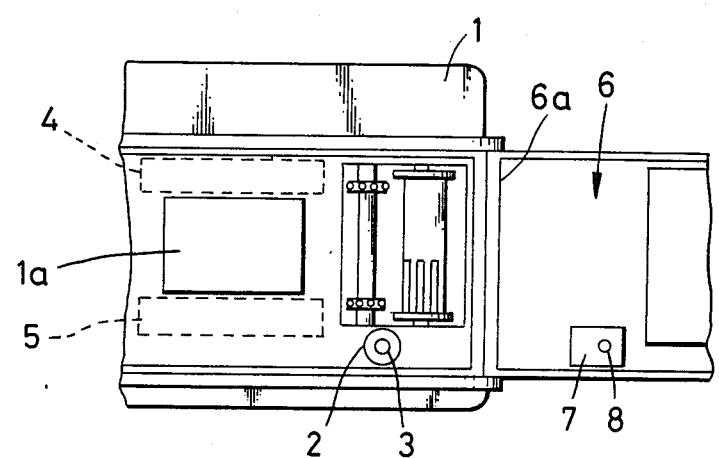
FIG. 1 is an external view of a camera embodying the present invention, in which the rear cover is opened.

Referring to FIG. 1, a housing 1 of the camera is provided with an insulating member 2 having an electrical contact 3 at the center thereof. A rear cover 6, rotatably linked to the housing 1 by a hinge 6a, is provided with a conductive pin 8 which is brought into contact with said contact 3 when the rear cover is closed.

Figure 2:
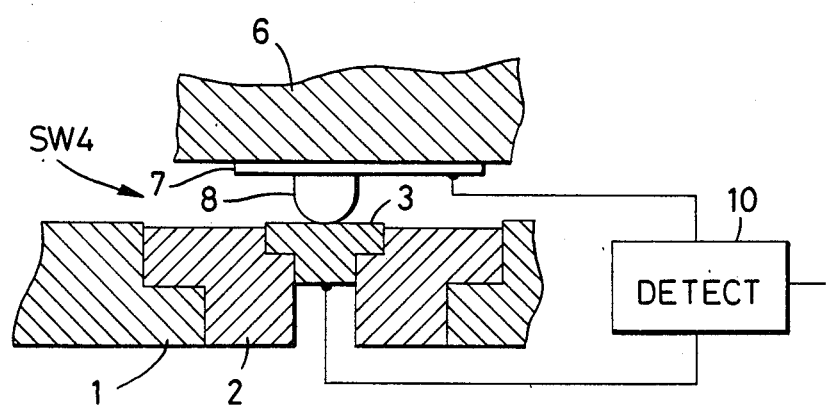
FIG. 2 is a cross-sectional view of a switch device of said camera in a state where said rear cover is closed.

FIG. 2 shows a state where said rear cover is closed. The pin 8 is maintained in contact with the contact 3 to constitute an electrical circuit, and a detection circuit 10 identifies the opened or closed state of the rear cover by detecting the state of said electrical circuit. The housing 1 is electrically connected to the rear cover 6 through the hinge 6a and is insulated from the contact 3 by the insulator 2, so that the rear cover 6 itself constitutes a switch SW4.

A leading blade member 4 and a trailing blade member 5 of the shutter respectively have plural blades and close an aperture 1a by extending said blades.

Figure 3:
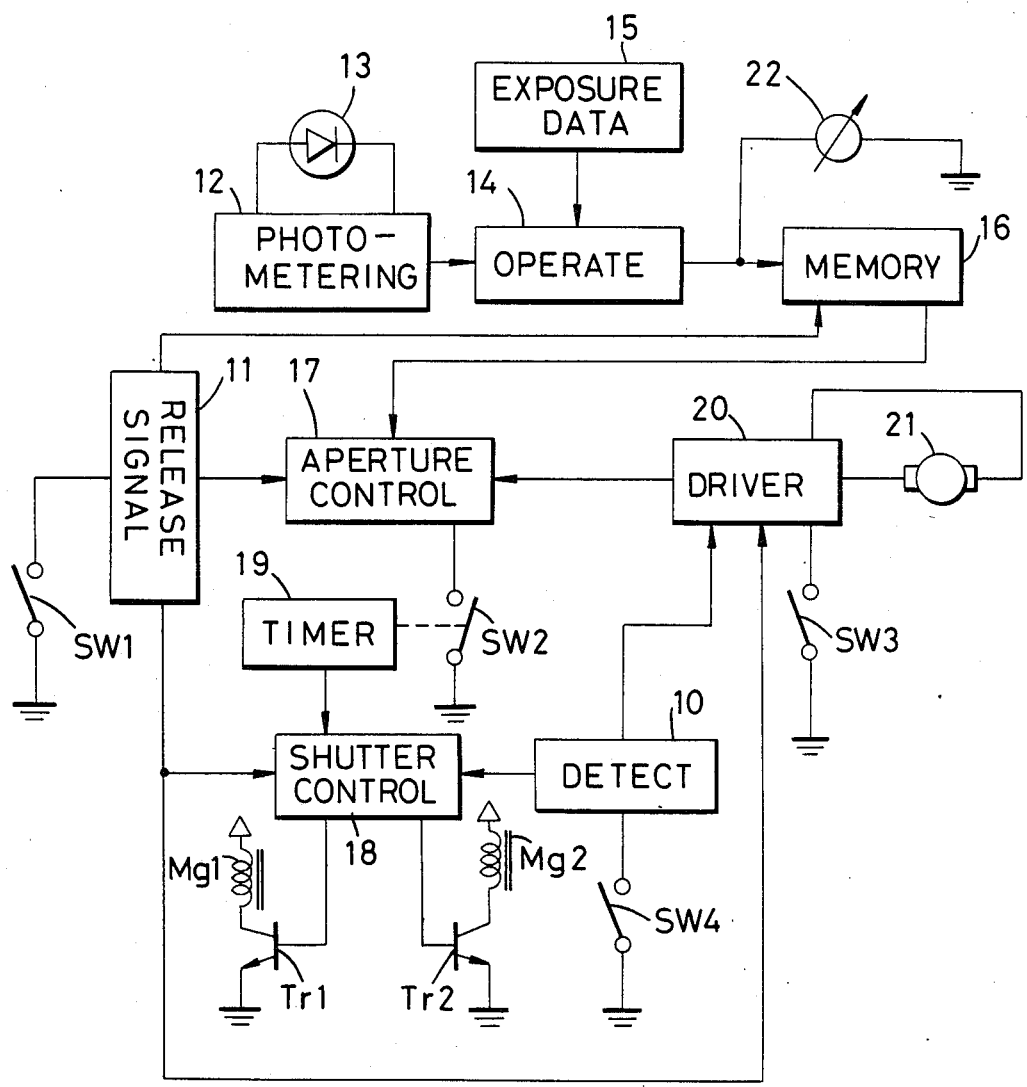
FIG. 3 is a block diagram of an electric circuit in said camera.

FIG. 3 is a block diagram of an electric circuit to be employed in the present invention. A release signal circuit 11 supplies a release signal to various units upon detection of closing of a release switch SW1 responding to the actuation of a release button (not shown). In response to the actuation of the release button, a photometering circuit 12 produces an output obtained by logarithmic compression of an output from a photosensor 13. Data such as film speed or preset aperture value are outputted from an exposure data circuit 15 and supplied to an operation circuit 14 to calculate an appropriate exposure. A memory circuit 16 stores the output from the operation circuit 14 in response to the release signal. The output from the operation circuit 14 is displayed by a meter 22. An aperture control circuit 17 controls the aperture in response to the output from the memory circuit 16. A shutter control circuit 18 receives a signal from a mirror switch SW2 which is closed when a return mirror is lifted and retracted from the photographing optical path, or from the detection circuit 10 to turn on or off transistors Tr1, Tr2 for controlling magnets Mg1, Mg2 which respectively drive the leading and trailing blade members of the shutter. Each magnet Mg1 or Mg2 is energized, when the corresponding transistor Tr1 or Tr2 is turned on, to attract an armature (not shown) thus retaining the shutter blade member, and releases the armature to cause the movement of the shutter blade member when said transistor is turned off.

Figure 4:
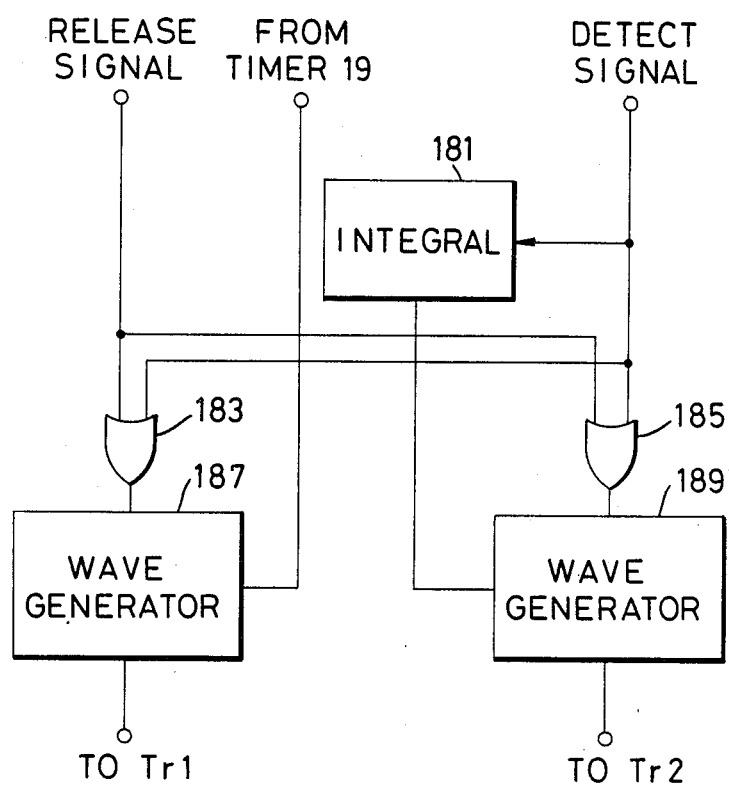
FIG. 4 is a block diagram of a shutter control circuit shown in FIG. 3.

The shutter control circuit 18 can be composed, for example as shown in FIG. 4, of a time integrating circuit 181, OR gates 183, 185 and a pair of wave generators 187, 189. Said wave generators 187, 189 supply H-level output signals respectively to the transistors Tr1, Tr2 in response to the release signal from the circuit 11 and/or the detection signal from the detection circuit 10, and the output of the wave generator 187 is inverted by the output of a timer 19. The integrating circuit 181 is provided to compare a voltage charged in an integrating capacitor with a reference voltage thereby obtaining a preprogrammed exposure time in relation to a predetermined or aforementioned aperture value, and the charging of said capacitor is started in response to the actuation of the release button. The output of the integrating circuit 181 inverts the output of the wave generator 189.

The charging of the capacitor in the integrating circuit 181 is prohibited by the detection signal from the detection circuit 10.

A motor driver circuit 20 drives a motor 21 in response to the release signal, a signal from the detection circuit 10 and a signal received from a switch SW3 in synchronization with the completion of closing of the aperture by the shutter blade members.

Figure 5:
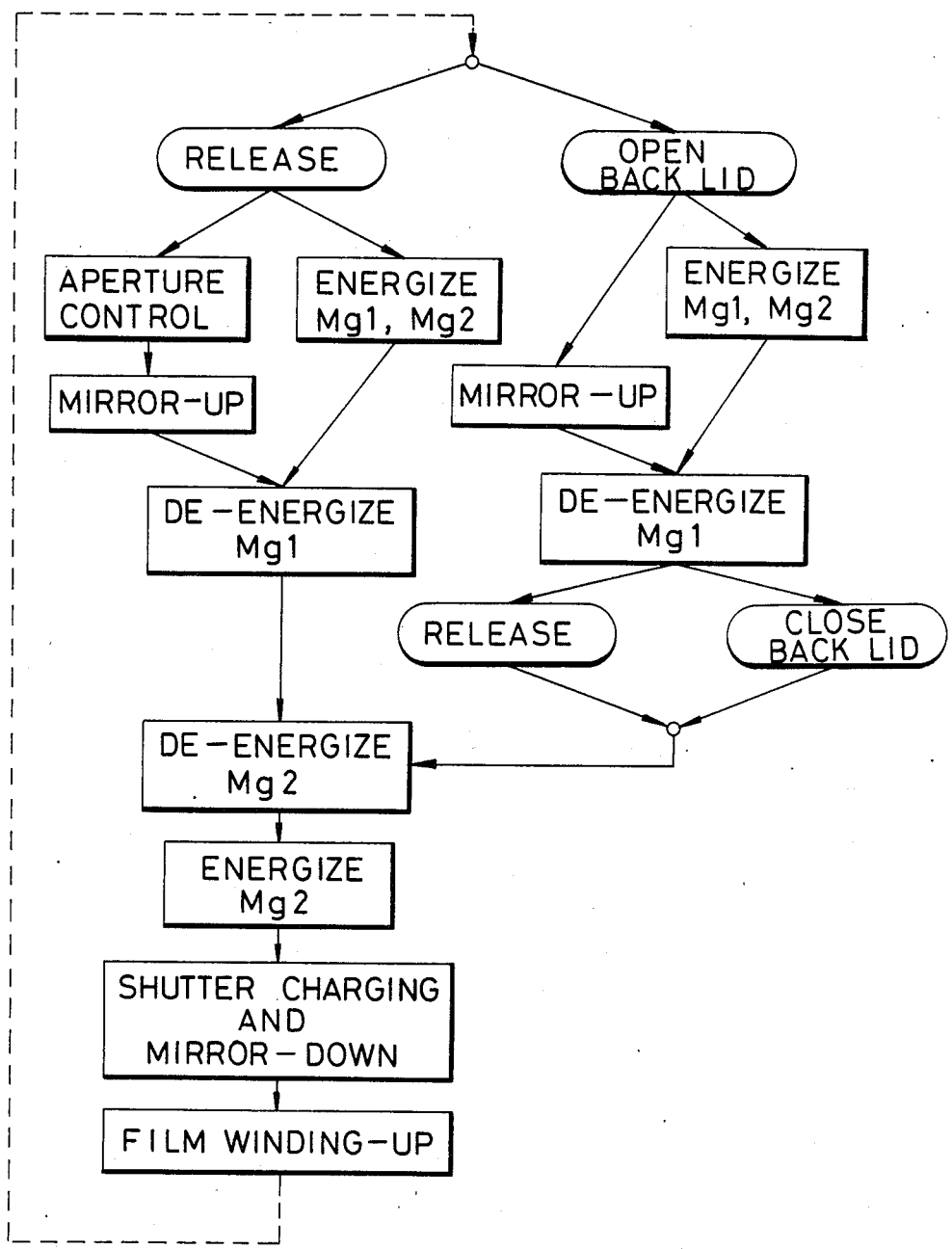
FIG. 5 is a flow chart showing the function of an embodiment.

Now reference is made to FIG. 5 for explaining the function of the present embodiment.

The camera is assumed to be in a state where the rear cover is closed and the photographic film has been advanced. When the shutter button is actuated in this state, the release switch SW1 is closed, and, in response to the signal therefrom, the release signal circuit 11 transmits the release signal to various units. Thus the motor 21 is activated through the motor driver 20 to actuate an aperture control mechanism (not shown). Also in response to the release signal, the aperture control circuit 17 receives the output from the memory circuit 16 to perform an aperture control operation in a known manner. In further response to the release signal, the wave generators 187, 189 of the shutter control circuit 18 activate the transistors Tr1, Tr2 to energize the magnets Mg1, Mg2, thus attracting the armatures.

Upon completion of the aperture control, the return mirror (not shown) starts to be lifted by the motor 21, and the mirror switch SW2 is closed in linkage with said mirror elevating operation. After a delay of a determined period defined by the timer 19 which has been activated since the start of mirror elevation, the wave generator 187 shifts the output signal to the transistor Tr1 from H-level to L-level to deactivate the magnet Mg1, thereby retracting the leading blade member 4 from the aperture 1a to a position shown in FIG. 1. After the lapse of a determined exposure time, the output of the integrating circuit 181 causes the wave generator 189 to shift the output signal to the transistor Tr2 from the H-level to L-level, thereby deactivating the magnet Mg2 whereby the trailing blade member 5 is moved upwards from a position shown in FIG. 1 to close the aperture 1a.

Upon completion of the movement of the trailing blade member, the switch SW3 is closed to generate a signal which activates the motor 21 through the motor driver 20. In response the return mirror is lowered and the shutter is charged. Subsequently the film is advanced, and a photographing operation is completed in this manner.

In the following there will be explained the function in case the rear cover is opened after film advancement is completed. When the rear cover 6 is opened, the switch SW4 is opened, and, in response, the detection circuit 10 transmits a detection signal, indicating that the rear cover is open, to various circuits. The motor driver 20 is also capable of driving the motor 21 in response to the detection signal from the detection circuit 10. The motor 21 reduces the aperture with diaphragm blades (not shown), but the aperture control operation is not conducted, due to the absence of the release signal from the release signal circuit 11. Consequently the aperture is reduced to a minimum aperture without control, and the mirror is lifted to close the mirror switch SW2.

In response to the detection signal, indicating that the rear cover is open, received from the detection circuit 10, the wave generators 187, 189 of the shutter control circuit 18 activate the transistors Tr1, Tr2, as in response to the release signal, thus energizing the magnets Mg1, Mg2. The wave generator 187 shifts the output signal to the transistor Tr1 to the L-level after the lapse of a determined period after the closing of the mirror switch SW2, but the other wave generator 189 continues to energize the magnet Mg2, because of the absence of the output from the integrating circuit 181, unless there is received the detection signal from the detection circuit 10 or the release signal. Thus, when the rear cover is open, the mirror switch SW2 causes the shutter control circuit 18 to deactivate the magnet Mg1 alone, thus opening the leading shutter blade member only.

If the rear cover is closed after the leading blade member is moved by opening the rear cover, the switch SW4 is closed to terminate the detection signal from the detection circuit 10. Thus the integrating circuit 181 is activated to invert the output of the wave generator 189, thereby deactivating the magnet Mg2 and causing the movement of the trailing blade member.

In case the release button is actuated after the leading blade member is moved by opening the rear cover, the shutter control circuit 18 receives the signal from the release signal circuit 11 to move the trailing blade member. The ensuing operation is the same as in the above-explained shutter release operation. However, since the rear cover is still open, the motor driver 20 continues to drive the motor even after the film advancement, in response to the signal from the detection circuit 10. Consequently the mirror is lifted to close the switch SW2, whereby the shutter control circuit 18 activates the transistors Tr1, Tr2 to energize the magnets Mg1, Mg2 and then deactivates the magnet Mg1 to move the leading blade member.

Though the foregoing explanation has been limited to a shutter unit with two magnets, the present invention is applicable to any shutter unit.

In the foregoing embodiment, if the release button is actuated in a state where the shutter blade member is retracted from the aperture by opening the rear cover, there are conducted operations of the movement of trailing blade member, descent of mirror, film advancement etc. followed by lifting of mirror and movement of leading blade member, but it is also possible to prohibit the actuation of the release button in said state and to enable the movement of the trailing blade member only by closing the rear cover.

We claim:

1. In a photographic camera with a focal plane shutter having a leading blade member and a trailing blade member, means for retracting the leading blade member from an aperture for exposure, means for extending the trailing blade member into the aperture, and a member for sensing position of a film chamber cover and for causing the retracting means to retract the leading blade member when the cover is opened, the improvement comprising:

means for charging said focal plan shutter by power of an electric motor, whereby said leading blade member is extended into said aperture and said trailing blade member is retracted from said aperture; and operation means for sequentially controlling said retracting means, said extending means and said charging means so that, when said cover is opened, and after said trailing blade member is extended into said aperture and said electric motor is driven to charge said leading blade member and said trailing blade member, successively, said leading blade member is retracted from said aperture while said trailing blade member is maintained at a position retracted from said aperture.

2. A photographic camera according to claim 1, wherein said camera is further provided with means for inhibiting the operation of said extending means so as to latch said trailing blade member at a position retracted from said aperture, and said operation means includes means for generating a shutter release signal and disables said inhibiting means in response to said shutter release signal.

* * * * *